US012608230B2

(12) United States Patent
Rao et al.

(10) Patent No.: US 12,608,230 B2
(45) Date of Patent: Apr. 21, 2026

(54) PREEMPTIVELY COOLING OF PROCESSING UNIT COMPUTE ELEMENTS

(71) Applicant: ADVANCED MICRO DEVICES, INC., Santa Clara, CA (US)

(72) Inventors: Karthik Rao, Austin, TX (US); Shomit N. Das, Austin, TX (US); Manish Arora, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 439 days.

(21) Appl. No.: 16/718,896

(22) Filed: Dec. 18, 2019

(65) Prior Publication Data

US 2021/0191770 A1 Jun. 24, 2021

(51) Int. Cl.
| | |
|---|---|
| *G06F 9/48* | (2006.01) |
| *G06F 1/20* | (2006.01) |
| *G06F 1/324* | (2019.01) |
| *G06F 9/38* | (2018.01) |

(52) U.S. Cl.
CPC ............ *G06F 9/4893* (2013.01); *G06F 1/206* (2013.01); *G06F 1/324* (2013.01); *G06F 9/3877* (2013.01)

(58) Field of Classification Search
CPC ........ G06F 9/4893; G06F 1/206; G06F 1/324; G06F 9/3877; G06F 1/329; G06F 1/3202; Y02D 10/00
See application file for complete search history.

(56) References Cited

U.S. PATENT DOCUMENTS

| | | | | |
|---|---|---|---|---|
| 7,971,102 B2 * | 6/2011 | Purrington | .............. | G06F 1/206 |
| | | | | 702/132 |
| 8,286,016 B2 * | 10/2012 | Monferrer | ................. | G06F 1/32 |
| | | | | 713/320 |
| 8,978,401 B2 * | 3/2015 | Chainer | ............. | H05K 7/20836 |
| | | | | 62/201 |
| 9,329,648 B2 * | 5/2016 | Chinnakkonda | ........ | G06F 1/206 |
| 10,078,359 B2 * | 9/2018 | Trautman | .............. | G06F 9/5094 |
| 2007/0097721 A1 * | 5/2007 | Chou | ................. | H05K 7/20209 |
| | | | | 363/141 |

(Continued)

OTHER PUBLICATIONS

"Phase Tracking and Prediction," In Proceedings of the 30th Annual International Symposium on Computer Architecture (ISCA), Jun. 9-11, 2003, by T. Sherwood, et al. (Year: 2003).*

(Continued)

*Primary Examiner* — Phil K Nguyen

(57) ABSTRACT

A processing unit preemptively cools selected compute units prior to initiating execution of a wavefront at the selected compute units. A scheduler of the processing unit identifies that a wavefront is to be executed at a selected subset of compute units of the processing unit. In response, the processing unit's temperature control subsystem activates one or more cooling elements to reduce the temperature of the subset of compute units, prior to the scheduler initiating execution of the wavefront. By preemptively cooling the compute units, the temperature control subsystem increases the difference between the initial temperature of the compute units and a thermal throttling threshold that triggers performance-impacting temperature control measures, such as the reduction of a compute unit clock frequency.

20 Claims, 6 Drawing Sheets

(56) References Cited

U.S. PATENT DOCUMENTS

| | | | | |
|---|---|---|---|---|
| 2010/0280680 | A1* | 11/2010 | Angell | G06F 1/206 |
| | | | | 700/36 |
| 2011/0265982 | A1* | 11/2011 | Jansen | G06F 1/206 |
| | | | | 165/200 |
| 2012/0053734 | A1* | 3/2012 | Kazama | G06F 1/206 |
| | | | | 700/275 |
| 2014/0025223 | A1* | 1/2014 | Chinnakkonda | G06F 1/206 |
| | | | | 700/300 |
| 2014/0326442 | A1* | 11/2014 | Kurpiewski | G06F 1/206 |
| | | | | 165/287 |
| 2015/0082811 | A1* | 3/2015 | Rangarajan | G06F 1/324 |
| | | | | 62/3.7 |
| 2016/0011607 | A1* | 1/2016 | James | G05B 15/02 |
| | | | | 700/300 |
| 2016/0357232 | A1* | 12/2016 | Kalyanasundaram | |
| | | | | G06F 1/3296 |
| 2017/0220022 | A1* | 8/2017 | Hankendi | G06F 11/3058 |
| 2017/0351448 | A1* | 12/2017 | Brown | G06F 1/3206 |
| 2018/0024578 | A1* | 1/2018 | Ahuja | G06F 1/206 |
| | | | | 700/300 |
| 2018/0275696 | A1* | 9/2018 | North | G05D 23/1917 |

OTHER PUBLICATIONS

Ayoub, R., and Rosing, T., 2009, "Predict and Act: Dynamic Thermal Management for Multi-Core Processors," 14th ACM/IEEE International Symposium on Low Power Electronics and Design (ISLPED '09), San Francisco, CA, August 19-21, pp. 99-104 (Year: 2009).*

Sahu, V., et al., "Transient Characterization of Hybrid Microfluidic-Thermoelectric Cooling Scheme for Dynamic Thermal Management of Microprocessor." Journal of Electronic Packaging 136.3, 2014, 8 pages. (Year: 2014).*

U.S. Appl. No. 16/220,827, filed Dec. 14, 2018 entitled "Apparatus and Method for Providing Workload Distribution of Threads Among Multiple Compute Units", 37 pages.

U.S. Appl. No. 16/228,036, filed Dec. 20, 2018 entitled "Runtime Localized Cooling of High- Performance Processors", 27 pages.

U.S. Application No. 16/213, 126 filed Dec. 7, 2018 entitled "Hint-Based Fine-Grained Dynamic Voltage and Frequency Scaling in Gpus", 22 pages.

* cited by examiner

| WFID | HINT | PV1 (MEMORY REQUESTS) | PV2 | • • • |
|------|------|------------------------|-----|-------|
| WF4 | CB | 10 | 50 | |
| WF5 | -- | 75 | 10 | |
| WF6 | PCIEB | 8 | 7 | |
| | | | | |

602 — RECEIVE WAVEFRONT AT QUEUE

604 — IDENTIFY WAVEFRONT TYPE

606 — COMPUTE-BOUND WAVEFRONT?

NO

YES

610 — IDENTIFY WAVEFRONT TYPE EXECUTING AT CU

608 — NO PREEMPTIVE COOLING

612 — COMPUTE-BOUND WAVEFRONT?

YES

NO

614 — PREEMPTIVELY COOL CU

616 — INITIATE EXECUTION OF WAVEFRONT

600

PREEMPTIVELY COOLING OF PROCESSING UNIT COMPUTE ELEMENTS

BACKGROUND

Thermal regulation of a processor facilitates improved performance and useful lifespan of a processing unit. In particular, as a processing unit performs operations, the circuitry of the processing unit generates heat. Left unregulated, the generated heat can negatively impact processor operations and shorten the useful lifespan of the processing unit. Accordingly, a processing system typically employs a temperature control subsystem that monitors the temperature of a processing unit and if the monitored temperature exceeds a threshold, takes remedial action, such as activating a temperature control element (e.g. a fan), reducing a clock speed governing operations of the processing unit, and the like. However, conventional temperature control subsystems are reactive and provide limited control options, thereby consuming an undesirable amount of cooling power.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 5 is a diagram of an example of a wavefront profile employed by the processing unit of FIG. 1 to identify an operation phase type of the wavefront in accordance with some embodiments.

DETAILED DESCRIPTION

Figure 1:
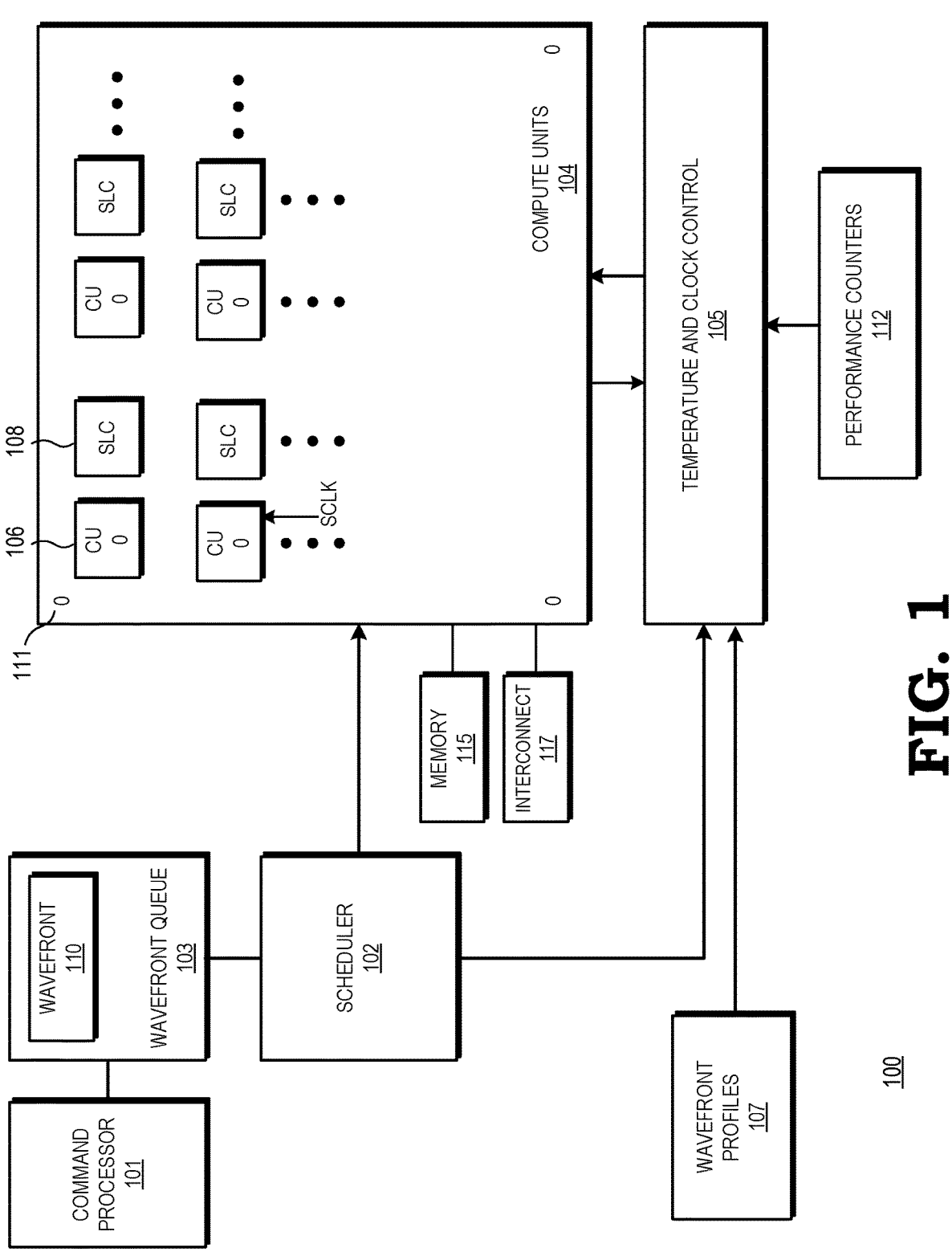
FIG. 1 is a block diagram of a processing unit that preemptively cools one or more compute units prior to initiating execution of a wavefront in accordance with some embodiments.

FIGS. 1-8 illustrate systems and techniques for preemptively cooling selected compute units of a processing unit prior to initiating execution of a wavefront at the selected compute units. To illustrate, a scheduler of the processing unit identifies that a wavefront is to be executed at a selected subset of compute units of the processing unit. In response, a temperature control subsystem of the processing unit activates one or more cooling elements prior to the scheduler initiating execution of the wavefront so as to preemptively cool the selected subset of compute units in anticipation of their execution of the wavefront. By preemptively cooling the compute units in this way, the temperature control subsystem increases the difference between the initial temperature of the compute units and a thermal throttling threshold that triggers performance-impacting temperature control measures, such as the reduction of a compute unit clock frequency. That is, preemptively cooling delays the time at which the compute units reach the thermal throttling threshold or, in some cases, ensures that the compute units do not reach the thermal throttling threshold, thereby improving compute unit performance and lifespan.

In some embodiments, the temperature control subsystem determines whether to preemptively cool a subset of compute units based on the types of operations associated with the wavefront. For example, some wavefronts require a relatively high number of operations at the compute unit itself and a relatively low number of other types of operations (e.g. memory accesses) and are therefore referred to as compute-bound wavefronts. Other wavefronts require a relatively low number of operations at the compute unit and a relatively high number of memory access operations and are therefore referred to as memory-bound wavefronts. Still other wavefronts require a relatively low number of memory accesses and a relatively low number of compute unit operations but require a relatively high number of operations over an interconnect (e.g. a Peripheral Component Interconnect Express (PCIe) interconnect) and are referred to as interconnect-bound wavefronts. The type of operations that govern the behavior of a given wavefront is referred to herein as the "operation phase type" of the wavefront. Compute-bound, memory-bound, and interconnect-bound are all examples of operation phase types. While the description below is set forth in the example context of compute-bound, memory-bound, and interconnect-bound wavefronts, it will be appreciated that the techniques described herein are applicable to other operation phase types.

The operation phase type of a wavefront has an impact on the temperature behavior of the compute units executing the wavefront. For example, execution of a compute-bound wavefront, because it requires a relatively large number of compute operations to be executed at the compute units themselves, typically causes a relatively large increase in the temperature of the compute units. In contrast, a memory-bound wavefront requires relatively smaller number of compute operations, and therefore causes a relatively small increase in the temperature of the compute units. Thus, preemptively cooling compute units that are scheduled to execute a compute-bound wavefront results in greater performance benefits for the processing unit, while preemptively cooling compute units that are scheduled to execute a memory-bound wavefront results in relatively smaller performance benefits, while consuming additional power from the preemptively cooling process. Furthermore, preemptively cooling compute units that are currently executing a memory-bound wavefront and are scheduled to subsequently execute a compute-bound wavefront, delays the onset of thermal throttling, thereby improving performance. Accordingly, and as described further herein, in some embodiments the temperature control subsystem of the processing unit identifies the operation phase type of each wavefront awaiting execution based on information such as explicit wavefront hints, on historical wavefront performance profiles, and the like, or a combination thereof. The temperature control subsystem preemptively cools only those compute units that are to execute wavefronts of a specified operation phase type. For example, in some embodiments the temperature control subsystem preemptively cools only compute units that are to execute compute-bound wavefronts, thereby improving performance while conserving power. In other embodiments, the temperature control subsystem preemptively cools only compute units that are to execute compute-bound wavefronts immediately after a memory-bound wavefront.

In some embodiments, the temperature control subsystem further conserves power by taking advantage of non-linearities in the thermal behavior of the compute units. For example, for a given application of cooling to a compute unit, the majority (over 60 per cent) of the resulting temperature change at the compute unit typically takes place over an amount of time corresponding to a single thermal time constant associated with the processing unit. Accordingly, in some embodiments, in response to a compute unit reaching a thermal throttling threshold, the temperature control subsystem activates a cooling element to cool the compute unit for an amount of time corresponding to a single time constant, rather than continuously or over an extended period of time. The temperature control subsystem thereby controls the temperature of the compute unit while reducing the overall amount of time the corresponding cooling element is activated, which in turn conserves power and extends the lifespan of the compute unit.

FIG. 1 illustrates a block diagram of a processing unit 100 that implements preemptively cooling of compute units in accordance with some embodiments. The processing unit 100 supports the execution of computer instructions at an electronic device, such as a desktop computer, laptop computer, server, game console, smartphone, tablet, and the like. In some embodiments, the processing unit 100 is part of a processing system of the electronic device, wherein the processing system includes additional components not illustrated at FIG. 1, including one or more additional processing units, memory modules external to the processing unit, and the like, that together support the execution of computer instructions.

In some embodiments, the processing unit 100 is designed to efficiently execute operations of one or more specified types on behalf of the processing system. For example, it is assumed for purposes of description that the processing unit 100 is a vector processing unit such as a graphics processing unit (GPU) that executes graphics and vector processing operations on behalf of the processing system. In other embodiments the processing unit 100 is a parallel processor, artificial intelligence (AI) processor, inference engine processor, machine learning processor, and the like.

To support execution of operations, the processing unit 100 includes a command processor (CP) 101, a scheduler 102, a wavefront queue 103, and compute units 104. The CP 101 delineates the operations to be executed at the processing unit 100. In particular, the CP 101 receives commands (e.g., draw commands) from another processing unit (not shown) such as a central processing unit (CPU). Based on a specified command architecture associated with the processing unit 100, the CP 101 interprets a received command to generate one or more sets of operations, wherein each set of operations is referred to herein as a wavefront (also referred to as a warp or a thread). Thus, each wavefront is a set of data that identifies a corresponding set of operations to be executed by the processing unit 100, including operations such as memory accesses, mathematical operations, communication of messages to other components of the processing system, and the like. The CP 101 stores each wavefront (e.g., wavefront 110) at the wavefront queue 103.

The compute units 104 are a plurality of individual compute units (e.g., compute unit 106) that execute operations of the wavefronts generated by the CP 101. Thus, in some embodiments each compute unit includes one or more processing elements that execute one or more specified operations identified by a wavefront. For example, in some embodiments each of the compute units 104 includes a plurality of single-instruction multiple data (SIMD) processing elements that perform vector processing or other operations delineated by the wavefront executing at the compute unit.

As noted above, the operations of a wavefront fall into different types, such as compute operations, memory access operations, and interface operations. Examples of compute operations include mathematical operations, vector manipulation operations, and the like, and such operations are executed in large part by the compute units themselves. Memory access operations include memory access requests to write or read data to or from a memory (e.g., memory 115 of the processing unit 100). Interface operations include operations that communicate messages to other elements of the processing unit 100 via an interconnect 117 (e.g. as a PCIE interconnect). In some embodiments, each of the operations is initiated at one of the compute units 104 by the compute unit fetching and decoding an instruction of a wavefront executing at the compute unit. That is, all of the different types of operations are executed at a compute unit, but as described further below, the different types of operations require different amounts of activity at the compute unit itself. Execution of the different types of operations therefore have different thermal impacts on the compute unit executing the operations.

It will be appreciated that, in many cases, a given wavefront will require execution of operations of different types at a compute unit, such as a combination of compute operations, memory access operations, and interconnect operations. As noted above, in some cases a wavefront includes a relatively high number of operations of a given type, and such wavefronts are classified as having the operation phase type corresponding to the given type of operation. Thus, for example, a wavefront having a relatively high number of compute operations requiring calculations at the compute unit itself, and a relatively low number of other types of operations (e.g. memory accesses), is classified as a compute-bound wavefront. In contrast, a wavefront having a relatively high number of memory access operations and a relatively low number of compute operations is classified as a memory-bound wavefront. As described further herein, the processing unit 100 employs the operation phase type of a wavefront as a basis for temperature control operations associated with the compute units executing the wavefront.

To illustrate, the scheduler 102 is a set of circuitry that manages scheduling of wavefronts at the compute units 104. In particular, in response to the CP 101 storing a wavefront at the wavefront queue 103, the scheduler 102 determines, based on a specified scheduling protocol, a subset of the compute units 104 to execute the wavefront. In some embodiments, a given wavefront is scheduled for execution at multiple compute units. That is, the scheduler 102 schedules the wavefront for execution at a subset of compute units, wherein the subset includes a plurality of compute units, with each compute unit executing a similar set of operations. The processing unit 100 is thereby able to support execution of wavefronts for large sets of data, such as data sets larger than the number of processing elements of an individual compute unit.

As noted above, the scheduler 102 selects the particular subset of compute units 104 to execute a wavefront based on a specified scheduling protocol. The scheduling protocol depends on one or more of the configuration and type of the processing unit 100, the types of programs being executed by the associated processing system, the types of commands received at the CP 101, and the like, or any combination thereof. In different embodiments, the selection protocol incorporates one or more of a number of selection criteria, including the availability of a given subset of compute units (e.g., whether the subset of compute units is executing a wavefront), how soon the subset of compute units is expected to finish executing a currently-executing wavefront, a specified power budget of the processing unit 100 that governs the number of compute units 104 that are permitted to be active, the types of operations to be executed by the wavefront, and the like.

The scheduler 102 further governs the timing, or schedule, of when each wavefront is executed at the compute units 104. For example, in some cases the scheduler 102 identifies that a wavefront (designated Wavefront A) is to be executed at a subset of compute units that are currently executing another wavefront (designated Wavefront B). The scheduler 102 monitors the subset of compute units to determine when the compute units have completed execution of Wavefront B. In response to Wavefront B completing execution, the scheduler 102 provides Wavefront A to the subset of compute units, thereby initiating execution of Wavefront A at the subset of compute units.

As noted above, during execution of a wavefront the circuitry of a compute unit generates heat. To prevent this generated heat from impacting operations, the processing unit 100 employs a temperature control subsystem including a plurality of temperature sensors (e.g., temperature sensor 111), a plurality of cooling elements (e.g., cooling element 108), and a temperature and clock control module (TCCM) 105. Each of the temperature sensors is a circuit or solid-state element that generates an electrical signal with characteristics that vary according to the temperature at or near the sensor. For example, in some embodiments each of the temperature sensors includes an element with an electrical resistance that varies according to the temperature, and the sensor generates an electrical signal based on the varying resistance. In the example of FIG. 1, each of the compute units 104 is assumed to include or be associated with a different corresponding temperature sensor, such that each temperature sensor indicates the temperature of an individual corresponding compute unit.

The plurality of cooling elements (e.g., cooling element 108) are modules that each apply a heat-dissipation (cooling) effect to a corresponding region of the processing unit 100 based on application of a corresponding control signal. In some embodiments, the cooling elements are solid-state SuperLattice thermo-electric Coolers (SLCs). In other embodiments the cooling elements are fans or other cooling unit. In the depicted example, each cooling unit is associated with a corresponding compute unit and applies a cooling effect to the corresponding compute unit in response to a control signal. Thus, for example, in some embodiments the cooling elements are a set of SLCs, with each SLC disposed over a corresponding compute unit in the stack of semiconductor layers that form the processing unit 100. In other embodiments, a given cooling element is associated with, and applies a cooling effect to, multiple compute units. For example, in some embodiments each cooling unit is a fan that applies a cooling effect to two or more compute units at a time.

The TCCM 105 employs the temperature sensors to regulate the temperature for the compute units 104. For example, in some embodiments the TCCM 105 monitors the temperature at each individual compute unit and, in response to a compute unit temperature exceeding a specified thermal throttling threshold, takes one or more remedial measures as described further below. In some embodiments, the thermal throttling threshold is based on specified maximum temperature that is expected to impact reliability of the processing unit 100, shorten the unit's useful lifespan, or a combination thereof. The thermal throttling threshold corresponds to the highest permitted operating temperature of the compute units 104 and is set to provide a margin between the specified maximum temperature and the highest permitted operating temperature.

The remedial measures available to the TCCM 105 include adjustment of one or more clock signals for the compute units, as well as application of cooling to individual compute units via the cooling elements. To illustrate with respect to the adjustment of clock signals, in some embodiments the operations at each compute unit are governed at least in part by an individual system clock (designated SCLK) signal, wherein the frequency of each individual SCLK signal is adjustable by the TCCM 105. In addition, the heat generated by a compute unit tends to vary proportionally and directly with the frequency of the compute unit's corresponding SCLK signal. Thus, in some embodiments, in response to the temperature of a compute unit reaching or exceeding the thermal throttling threshold, the TCCM 105 reduces the frequency of the SCLK signal for the compute unit, thereby reducing the heat generated by the compute unit and maintaining the temperature of the processing unit below the specified maximum temperature.

In some embodiments, in addition to or instead of adjusting the SCLK signal for a compute unit, the TCCM 205 regulates compute unit temperature with the cooling elements. For example, in some embodiments each cooling unit is individually controllable by the TCCM 205 to be set to either of two different states: a lower-power state (referred to herein as the "low-cooling state") wherein the cooling element applies a relatively small amount of cooling to the corresponding compute element, and a higher-power state (referred to herein as the "high-cooling state") wherein the cooling element applies a relatively high amount of cooling to the corresponding compute element. When the monitored temperature of a compute unit is below the thermal throttling threshold the TCCM maintains the corresponding cooling element in the low-cooling state. In response to a compute unit reaching or exceeding the thermal throttling threshold, the TCCM places the corresponding cooling element in the high-cooling state, thereby maintaining the temperature of the processing unit below the specified maximum temperature.

It will be appreciated that in different embodiments the TCCM 105 employs both the cooling elements and clock frequency control to regulate the temperature of individual compute units. Further, in some embodiments the TCCM 105 employs different thresholds for triggering adjustment of the cooling elements and adjustment of the SCLK frequency. Moreover, in some embodiments the cooling elements have multiple power states, each corresponding to a different amount of applied cooling and corresponding power consumption, and each associated with a different corresponding triggering threshold.

In some embodiments, the TCCM 105, together with the scheduler 102, supports preemptively cooling of subsets of the compute units 104. That is, the TCCM 105 applies cooling to one or more of the compute units 104 in response to a wavefront being generated by the CP 101, but prior to a wavefront initiating execution at the one or more compute units. To effectuate preemptively cooling, the scheduler 102 selects a given subset of the compute units 104 to execute a wavefront on the compute units 104, as explained above, and notifies the TCCM 105 of the selected subset. In response to the notification, and prior to the scheduler 102 providing the wavefront to the select subset of compute units (that is, prior to initiating execution of the wavefront), the TCCM 105 sets the cooling elements for the selected subset of compute units to the high-cooling mode. The TCCM 105 thereby reduces the temperature of the selected subset of compute units prior to the wavefront initiating execution at the selected subset, allowing the selected subset of compute units to operate at a relatively high clock speed (that is, with a high SCLK frequency) for a longer period of time before reaching the thermal throttling threshold (or preventing the thermal throttling threshold from being reached at all), thus improving overall performance of the processing unit 100.

In some embodiments, preemptively cooling is less beneficial for wavefronts having one of a given set of operation phase types, such that any performance benefit from preemptively cooling is outweighed by the corresponding power costs. For example, for some processing units, preemptively cooling provides a relatively small benefit for memory bound and interconnect-bound wavefronts, as these types of wavefronts require fewer operations at the compute units themselves and therefore result in a relatively small temperature increase during execution. In contrast, preemptively cooling provides a larger benefit for compute-bound wavefronts that require a relatively large number of operations at the compute units themselves.

Accordingly, to improve performance while conserving power, in some embodiments the TCCM 105 implements selective preemptively cooling based on a wavefront's operation phase type. That is, the TCCM 105 implements preemptively cooling only for compute units that are to execute wavefronts of one or more given operation phase types (e.g., only for compute-bound wavefronts) and does not implement preemptively cooling for compute units that are to execute wavefronts of one or more other operation phase types (e.g. memory bound and interconnect-bound wavefronts).

To implement selective preemptively cooling, for each wavefront awaiting execution at the wavefront queue 103, the TCCM 105 identifies the operation phase type of the wavefront as described further below. In response to identifying that a wavefront is of one or more specified operation phase types, the TCCM 105 preemptively cools the compute units selected to execute the wavefront as described above. Otherwise, the TCCM 105 does not preemptively cool the selected compute units. For example, in response to identifying that the wavefront is a compute-bound wavefront, the TCCM 105 preemptively cools the compute units scheduled to execute the wavefront. In response to identifying that the wavefront is a memory-bound wavefront or an interconnect-bound wavefront, the TCCM 105 does not preemptively cool the compute units.

In some embodiments, the TCCM 105 employs additional criteria to determine whether to implement preemptively cooling, such as the operation phase type of the wavefront currently executing at the selected subset of compute units when the preemptively cooling decision is made. For example, in some embodiments preemptively cooling compute units that are currently executing a compute-bound wavefront provides a relatively small cooling effect (because the larger amount of heat being generated at the subset of compute units). In contrast, compute units that are currently executing a memory-bound wavefront provides a relatively large cooling effect, and therefore a larger preemptively cooling benefit. Accordingly, in some embodiments the TCCM 105 implements preemptively cooling for a selected subset of compute units that satisfy both of two conditions: 1) the selected subset of compute units is scheduled to execute a compute-bound wavefront; and 2) the selected subset of compute units is currently executing either a memory-bound or interconnect-bound wavefront. If either of these conditions is not satisfied, the TCCM 105 does not implement preemptively cooling for the selected subset.

To identify the operation phase type for a wavefront, the TCCM 105 employs a set of wavefront profiles 107. As described further below, the wavefront profiles 107 store profile information that indicates the operation phase type for at least a subset of wavefronts generated by the command processor 101. An example of the profile information is one or more wavefront hints that are explicit indicators of the operation phase type of the wavefront provided by the wavefront itself, such as an indicator that the wavefront is a compute-bound wavefront. In some embodiments, the wavefront hints are generated by the CP 101 based on hints generated by a compiler of the computer program that generated the corresponding wavefront.

Another example of the profile information is performance data recorded by a set of performance counters 112 of the processing unit 100. To illustrate, in some embodiments the first N times that a wavefront is executed at the processing unit 100, where N is a specified integer, the performance counters record performance information for the wavefront, such as the number of compute unit operations required by the wavefront, the number of memory accesses required by the wavefront, the number of interconnect messages required by the wavefront, and the like. The TCCM 105 records the performance information, or a statistical representation (e.g., an average) thereof, at the wavefront profiles 107. When the wavefront is subsequently stored at the wavefront queue 103 to await execution, the TCCM 105 determines an operation phase type of the wavefront based on the stored profile information for the wavefront. For example, in some embodiments the TCCM 105 identifies a wavefront as having a given operation phase type in response to the profile information for the wavefront indicating that a number of operations corresponding to that operation phase type exceeds a threshold. For example, in response to the profile information for a wavefront indicating that the number of compute unit operations for the wavefront exceeds a threshold, the TCCM 105 identifies the wavefront as a compute-bound wavefront. The TCCM 105 uses the identified operation phase type of a wavefront to determine whether to implement preemptively cooling, as described above.

Figure 2:
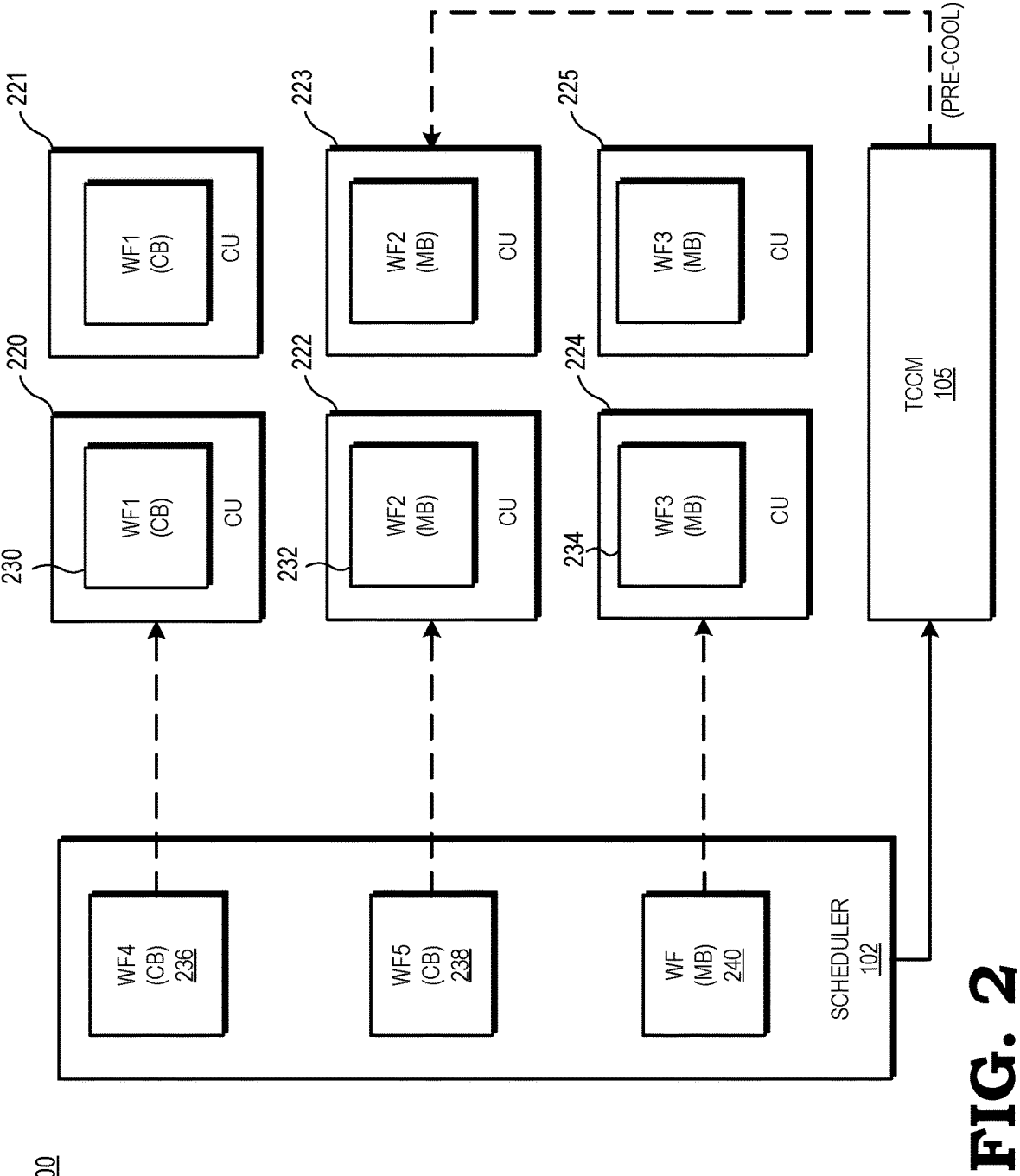
FIG. 2 is a block diagram illustrating an example of the processing unit of FIG. 1 for preemptively cooling compute units based on an operation phase type of a wavefront in accordance with some embodiments.

FIG. 2 illustrates an example of the processing unit 100 preemptively cooling compute units based on operation phase types of pending and executing wavefronts in accordance with some embodiments. For the example of FIG. 2, it is assumed that the TCCM 105 implements a preemptively cooling scheme wherein preemptively cooling is applied to a compute unit only if both of two conditions are satisfied:) the compute unit is scheduled to execute a compute-bound wavefront; and 2) the compute unit is currently executing either a memory-bound or interconnect-bound wavefront.

In the depicted example, the compute units 104 include compute units 220-225. The compute units 220 and 221 form a compute unit subset that is executing a compute-bound wavefront 230, the compute units 222 and 223 form a compute unit subset that is executing a memory-bound wavefront 232, and the compute units 224 and 225 form a compute unit subset that is executing a memory-bound wavefront 234. In addition, the scheduler identifies three wavefronts that are pending for execution at the wavefront queue 103 (not shown at FIG. 2 for clarity): a compute-bound wavefront 236, a compute-bound wavefront 238, and a memory-bound wavefront 240. Based on the scheduling criteria associated with the processing unit 100, the scheduler determines that the wavefront 236 is to be scheduled for execution at the compute units 220 and 221, that the wavefront 238 is to be scheduled for execution at the compute units 222 and 223, and that wavefront 238 is to be scheduled for execution at the compute units 224 and 225.

The TCCM 105 identifies compute units for preemptively cooling based on the operation phase types of the pending and executing wavefronts, as follows: the wavefront 236 is a candidate for preemptively cooling based on the wavefront 236 being of a compute-bound type. However, the wavefront 236 is scheduled to be executed at the compute units 220 and 221, which are currently executing a compute-bound wavefront (wavefront 230). Accordingly, the TCCM does not apply preemptively cooling to the compute units 220 and 221.

With respect to the wavefront 238, the wavefront is a candidate for preemptively cooling based on the wavefront 238 being of a compute-bound type. In addition, the wavefront 238 is to be executed at compute units 222 and 223, which are currently executing a memory-bound wavefront (wavefront 232). The TCCM 105 therefore applies preemptively cooling to the compute units 222 and 223 by placing the cooling elements corresponding to the compute units 222 and 223 in a high-cooling state while the wavefront 232 is still being executed, and prior to the scheduler 102 initiating execution of the wavefront 238 at the compute units 222 and 223.

With respect to the wavefront 240, the TCCM 105 determines that the wavefront 240 is of a memory bound type. Accordingly, wavefront 240 is not a candidate for preemptively cooling, and the TCCM 105 therefore does not apply preemptively cooling to the compute units 224 and 225, where the wavefront 240 is to be executed. The TCCM 105 thereby prevents the excess power consumption that would result from preemptively cooling for a wavefront (wavefront 240) that is unlikely to cause the compute units 224 and 225 to reach the thermal throttling threshold during execution.

Figure 3:
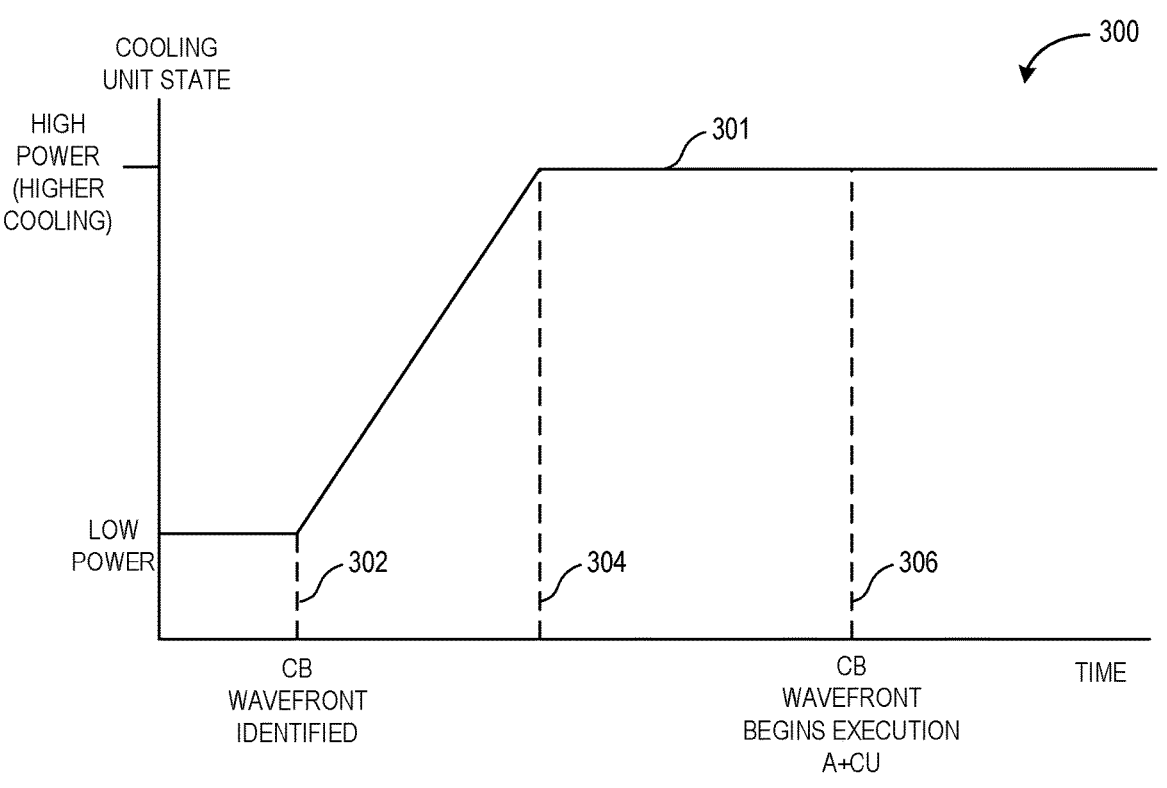
FIG. 3 is a diagram illustrating an example of preemptively cooling compute units of the processing unit of FIG. 1 in accordance with some embodiments.

FIG. 3 illustrates a diagram 300 that depicts an example of the timing of preemptively cooling at the processing unit 100 relative to initiating execution of a wavefront in accordance with some embodiments. The diagram 300 includes an x-axis, representing time, and a y-axis representing the state of a cooling unit associated with a given compute unit. For ease of description, it is assumed that the cooling unit is cooling unit 108 of FIG. 1, and that the cooling unit 108 provides cooling (heat dissipation) to the associated compute unit 106. In addition, it is assumed that the TCCM 105 is able to set the cooling unit 108 to either of two states: a low-power state, wherein the cooling unit 108 provides a relatively small heat dissipation effect to the associated compute unit 106, and a high-power state, wherein the cooling unit 108 provides a relatively high heat dissipation effect to the compute unit 106. In some embodiments, the low-power state corresponds to an "off" state of the cooling unit 108, such that the cooling unit 108 provides little or no cooling effect. The state of the cooling unit 108 over time is depicted in the diagram 300 by a plot 301.

As shown by the plot 301, prior to a time 302 the TCCM 105 maintains the cooling unit 108 in the low-power state. In some embodiments, prior to time 302 there is no wavefront executing at the compute unit 106 while in other embodiments, prior to time 302 the compute unit 106 is executing a non-compute-bound wavefront (e.g., a memory-bound wavefront or an interconnect-bound wavefront). In either case, the compute unit 106 is unlikely to reach the thermal throttling threshold prior to time 302, and the TCCM therefore maintains the cooling unit 108 in the low-power state to conserve power.

Before time 302, the scheduler 102 identifies that wavefront 110 has been stored at the wavefront queue 103, and further identifies that the wavefront 110 is to be executed at the compute unit 106. The scheduler 102 notifies the TCCM 105, which identifies, based on the wavefront profiles 107, that the wavefront 110 is a compute-bound wavefront. In response, at time 302 the TCCM 105 initiates a transition of the cooling unit 108 from the low-power state to the high-power state. The transition to the high-power state is completed at a time 304, thereby initiating cooling of the compute unit 106.

After time 304, the scheduler 102 provides the wavefront 110 to the compute unit 106. Accordingly, at a time 306, and after time 304, the wavefront 110 begins execution at the compute unit 106. Thus, between time 304 and time 306, the compute unit 106 is preemptively cooled for wavefront 110. That is, the compute unit 106 is cooled in response to processing unit 100 receiving the wavefront 110, and prior to the time that the wavefront 110 begins execution at the processing unit 100. The processing unit 100 thereby delays the time at which the compute unit 106 reaches the thermal throttling threshold while executing the wavefront 110 or prevents the compute unit 106 from reaching the thermal throttling threshold at all during execution of the wavefront 110. In either case, the SCLK signal that controls operations of the compute unit 106 is maintained at a higher clock speed for a longer period of time, thereby improving performance of the processing unit 100.

Figure 4:
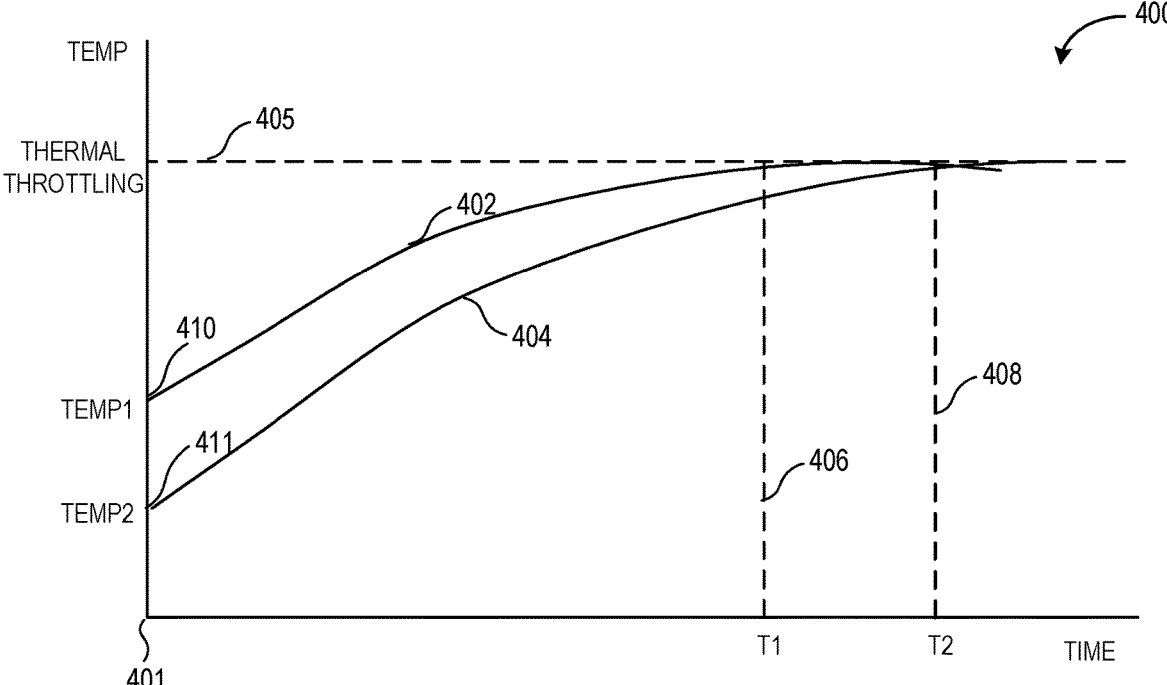
FIG. 4 is a diagram illustrating how preemptively cooling of a compute unit of FIG. 1 delays the point at which the compute unit reaches a thermal throttling temperature in accordance with some embodiments.

FIG. 4 illustrates a diagram 400 that depicts an example of preemptively cooling delaying a compute unit from reaching the thermal throttling threshold in accordance with some embodiments. The diagram 400 includes an x-axis, representing time, and a y-axis, representing temperature of the compute unit 106. The diagram 400 further depicts a line 405, representing the thermal throttling threshold for the processing unit 100.

In addition, the diagram 400 illustrates plots 402 and 404, each representing the temperature of the compute unit 106 as it executes the wavefront 110, under different conditions, over time. In particular, the plot 402 represents the temperature of the compute unit 106 over time as the compute unit 106 executes the wavefront 110, and without the TCCM 105 preemptively cooling the compute unit 106. In contrast, the plot 404 represents the temperature of the compute unit 106 over time as the compute unit executes the wavefront 110, but with compute unit 106 being preemptively cooled by the TCCM 105 prior to initiating execution of the wavefront 110.

A time 401 represents the time that the compute unit 106 initiates execution of the wavefront 110. A temperature 410 represents the temperature of the compute unit 106 at time 401 without preemptively cooling, and a temperature 411 represents the temperature of the compute unit 106 with preemptively cooling. Thus, plot 402 (the plot representing execution without preemptively cooling) begins at the higher initial temperature 410, and the plot 404 (the plot representing execution with preemptively cooling) begins at the lower initial temperature 411. Because the plots 402 and 404 both represent the change in temperature of the compute unit 106 as it executes the wavefront 110, the two plots have a similar shape. However, because the plot 402 begins at a higher initial temperature, the plot 402 reaches the thermal throttling threshold at a time 406, while the plot 404 does not reach the thermal throttling threshold until a time 408, after time 406. Thus, the plots 404 and 406 illustrate that preemptively cooling the compute unit 106 delays the time at which the compute unit 106 reaches the thermal throttling threshold. This allows the TCCM to avoid reducing the frequency of SLCK for a longer period of time (i.e., the period of time between times 406 and 408) thereby improving performance of the processing unit 100.

As described above, in some embodiments the TCCM 105 determines whether to preemptively cool a compute unit based on the operation phase type of the wavefront to be executed at the compute unit. Further, in some embodiments the TCCM 105 identifies the operation phase type of the wavefront based on the wavefront profiles 107. An example of the wavefront profiles 107 is illustrated at FIG. 5 in accordance with some embodiments. In the illustrated example, the wavefront profiles 107 includes a plurality of entries (e.g., entry 550), with each entry representing the profile for a different wavefront. Each entry includes a plurality of fields, including a wavefront identifier (ID) field 540, a hint field 542, and a plurality of performance value (PV) fields (e.g. PV fields 544, 546).

The wavefront ID field stores an identifier for the wavefront associated with the entry. In some embodiments, the wavefront ID is generated for a wavefront by the CP 101 when the CP 101 generates the wavefront based on a received command. In some embodiments, the CP 101 receives the same or similar commands over time, representing the same or similar actions (such as a draw command to draw the same or similar object at different times). For the same or similar commands, the CP 101 generates the same wavefronts, and further generates the same wavefront IDs. The wavefront ID thus provides a unique identifier for a given wavefront. In some embodiments, in response to receiving a wavefront that does not have a corresponding entry of the wavefront profiles 107, the CP 101 reserves an entry of the wavefront profiles 107 for the wavefront and stores the wavefront ID at the corresponding wavefront ID field.

The hint field 542 stores an indicator of any operation phase type hints that were provided with a wavefront. For example, in some embodiments the processing unit 100 receives commands from a CPU executing a computer program, as noted above with respect to FIG. 1. A compiler of the computer program, or the computer program during execution, generates hints for one or more of the resulting commands, indicating a predicted operation phase type of the wavefronts generated based on the command. For example, for different commands a wavefront is indicated as likely to be compute-bound, memory-bound, or interconnect bound. The CP 101 identifies the hint for each command, if any, and stores the hint at the hint field 542 of the entry corresponding to the wavefront.

The PV fields of an entry store performance values for the corresponding wavefront. Examples of performance values include a number of compute operations generated by the wavefront during execution at an individual compute unit, a number of memory accesses generated by the wavefront during execution, a number of interconnect messages generated by the wavefront during execution, and the like. In some embodiments, the first N times that a wavefront is executed at a compute unit, where N is a specified integer value, the performance counters 112 (FIG. 1) record the performance values for the wavefront, and the TCCM 105 generates the PV field values for the wavefront based on these performance values recorded at the performance counters 112. For example, in some embodiments the TCCM 105 generates the PV field values based on an average of the corresponding performance values over the N executions of the corresponding wavefront. The TCCM 105 stores each PV field values at the correspond PV fields of the entry of the wavefront profiles 107 associated with the wavefront.

In operation, in response to a wavefront being stored at the wavefront queue 103, the scheduler 102 provides the wavefront ID for the wavefront to the TCCM 105. In response, the TCCM 105 identifies the entry of the wavefront profiles 107 having the matching wavefront ID. The TCCM 105 then uses the hint value and PV values stored at the identified entry to determine an operation phase type for the wavefront. For example, in some embodiments, if the hint value for a wavefront indicates a particular operation phase type, the TCCM 105 determines that the wavefront is of the type indicated by the hint. If no hint is provided, the TCCM 105 compares the PV values for the wavefront to corresponding specified PV thresholds, and based on the comparison determines the operation phase type for the wavefront. For example, in some embodiments, if the PV values for a wavefront indicate that the number of compute operations generated by the wavefront exceeds a threshold, the TCCM 105 determines that the wavefront is a compute-bound wavefront. The TCCM 105 uses the operation phase type of the wavefront to determine whether to preemptively cool one or more compute units, as described above.

Figure 6:
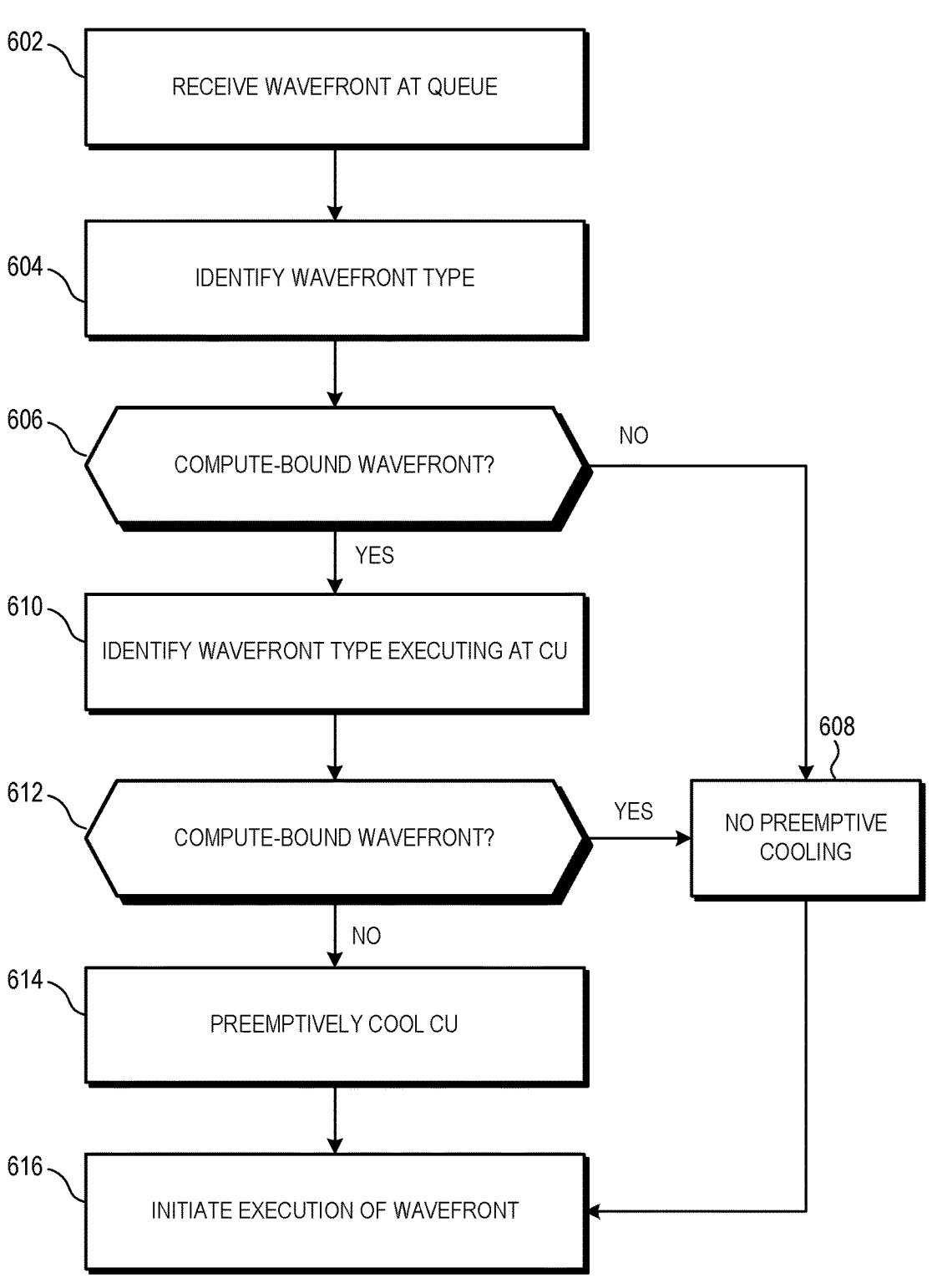
FIG. 6 is a flow diagram of a method of preemptively cooling one or more compute units of a processing unit prior to initiating execution of the wavefront at the compute units in accordance with some embodiments.
Figure 7:
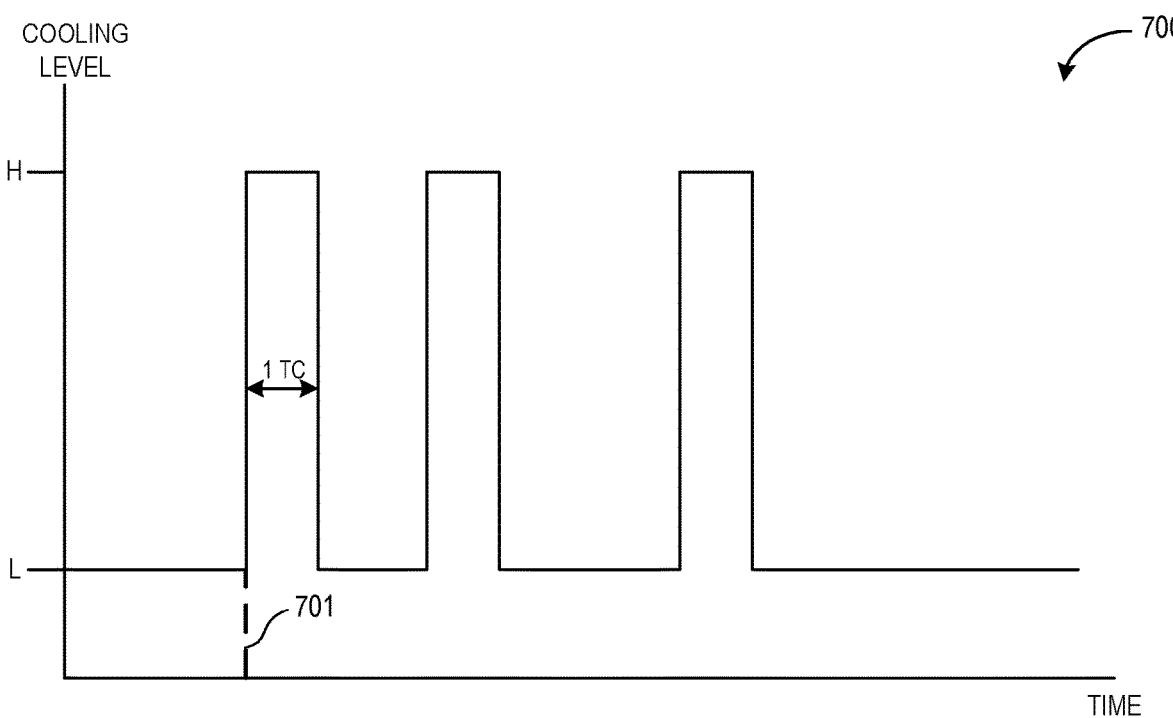
FIG. 7 is a flow diagram of a method of controlling cooling elements of a processing unit based on a time constant of the processing unit in accordance with some embodiments.

FIG. 6 illustrates a flow diagram of a method 600 of preemptively cooling compute units of a processing unit in accordance with some embodiments. The method 600 is described with respect to an example implementation at the processing unit 100 of FIG. 1. At block 602, the CP 101 generates the wavefront 110 based on a received command and stores the wavefront at the wavefront queue 103. In response, the scheduler 102 determines the subset of compute units 104 that are to execute the wavefront 110 based on the specified scheduling criteria. The scheduler 102 provides the wavefront ID for the wavefront 110, and information indicating the selected subset of compute units, to the TCCM 105.

At block 604, the TCCM 105 uses the provided wavefront ID to determine an entry of the wavefront profiles 107 corresponding to the received wavefront. The TCCM 105 uses the fields of the identified entry to determine an operation phase type of the wavefront 110. At block 606, the TCCM 105 determines if the operation phase type of the wavefront 110 is a compute-bound type. If not (e.g., if the wavefront 110 is a memory-bound or interconnect-bound wavefront), the method flow proceeds to block 608 and the TCCM 105 does not preemptively cool the selected subset of compute units. The method flow moves to block 616, and the scheduler 102 initiates execution of the wavefront 110 at the selected subset of compute units. Thus, for the example method 600, if the wavefront 110 is not a compute-bound wavefront, the TCCM 105 does not preemptively cool the selected subset of compute units prior to execution of the wavefront 110.

Returning to block 606, if the wavefront 110 is a compute-bound wavefront the method flow proceeds to block 610 and the TCCM 105 identifies the operation phase type of the wavefront currently executing at the subset of compute units. At block 612, the TCCM 105 determines whether the currently executing wavefront is a compute-bound wavefront. If so, the method flow moves to block 608 and no preemptively cooling is performed. That is, the TCCM 105 does not preemptively cool the selected subset of compute units if the currently executing wavefront is a compute-bound wavefront, as preemptively cooling is likely to have a reduced performance impact.

Returning to block 612, if the currently executing wavefront is not compute bound, the method flow moves to block 614 and the TCCM 105 initiates preemptively cooling of the selected subset of compute units. Subsequently, at block 616, the scheduler 102 initiates execution of the wavefront 110 at the selected subset of compute units.

As noted above, in some embodiments the cooling elements of the processing unit 100 have a non-linear heat-dissipation effect on the corresponding CUs over time. For example, in some embodiments, over 60 percent of the heat dissipation effect of a cooling unit takes place over a single thermal time constant of the processing unit 100. Accordingly, in some embodiments, for each activation of a cooling element (that is, each time a cooling element is placed in a high-power, increased cooling mode) the TCCM 105 maintains the cooling element in the increased cooling mode only for an amount of time corresponding to one thermal time constant of the processing unit 100. An example is illustrated at a diagram 700 of FIG. 7 in accordance with some embodiments.

The diagram 700 includes an x-axis, representing time, and a y-axis representing the cooling level of the cooling element 108. In the depicted example, the TCCM can place the compute unit 106 in either of two states, a higher power, higher cooling state and a lower power, lower cooling state. At a time 701, in response to a specified cooling event such as the compute unit 106 reaching the thermal throttling threshold, the TCCM 105 places the cooling unit 108 in the higher cooling state. As shown, the TCCM 105 maintains the cooling unit 108 in the higher cooling state for an amount of time corresponding to the thermal time constant of the processing unit 100.

In some embodiments, the thermal time constant of the processing unit 100 is determined during a characterization phase of the manufacture of the processing unit 100 (or a processing unit of the same design). For example, in some embodiments the thermal time constant for the processing unit 100 is determined during the characterization phase by heating the processing unit 100 to a first specified temperature and measuring the amount of time it takes for the processing unit 100 to cool to a different specified temperature. In other embodiments, the thermal time constant is determined based on the semiconductor process, used to form the processing unit 100, the materials used to form the processing unit 100, and other elements, as is known in the art. The thermal time constant is stored at a set of fuses or other storage element that is accessible by the TCCM 105.

Returning to FIG. 7, the diagram 700 illustrates an example of the cooling unit 108 being activated by the TCCM 105 in a series of "bursts" wherein each burst corresponds to a single thermal time constant of the processing unit 100. By activating the cooling unit 108 in this way, the cooling unit 108 applies a large portion of the available cooling effect while reducing the overall amount of power used for cooling the compute unit 106.

Figure 8:
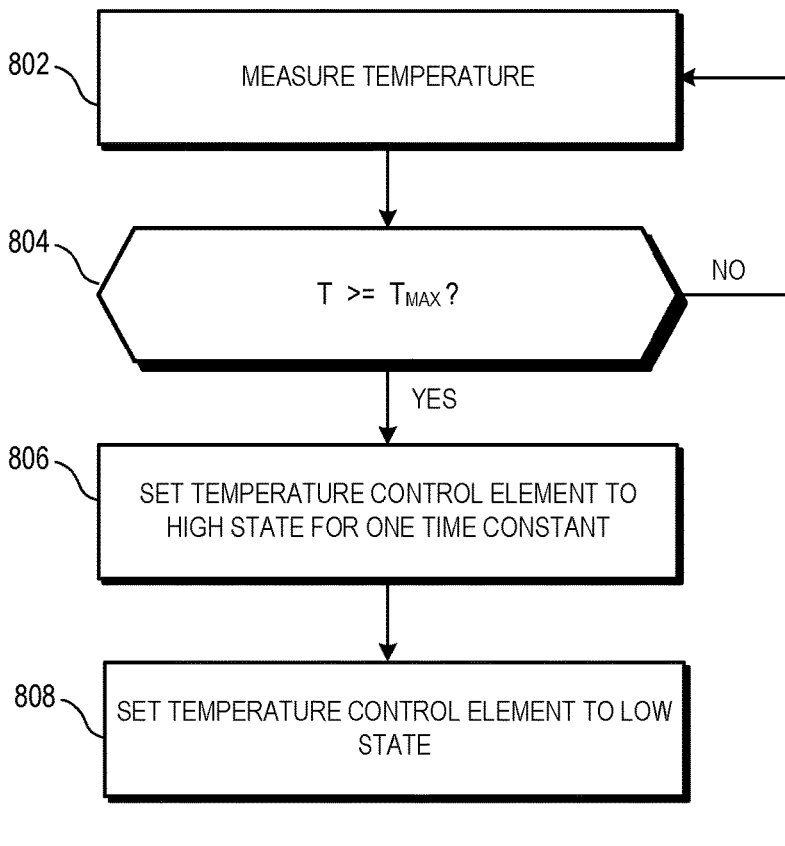
FIG. 8 is a diagram illustrating an example of controlling cooling elements of a processing unit based on a time constant of the processing unit in accordance with some embodiments.

FIG. 8 illustrates a flow diagram of a method 800 of activating a cooling element based on a thermal time constant of a processing unit in accordance with some embodiments. For purposes of description, the method 800 is described with respect to an example implementation at the processing unit 100 of FIG. 1. At block 802, the TCCM 105 measures the temperature of the compute unit 106 based on information provided by one or more temperature sensors (e.g. temperature sensor 111). At block 804, the TCCM 105 determines whether the measured temperature meets or exceeds the thermal throttling threshold (designated $T_{MAX}$). If not, the method flow returns to block 802.

If the temperature of the compute unit 106 meets or exceeds the thermal throttling threshold, the method flow moves to block 806, and the TCCM 105 sets the cooling element 108 to the higher-cooling state for a time corresponding to one thermal time constant of the processing unit 100. At block 808 the TCCM 105 returns the cooling element 108 to the lower cooling state. The method returns to block 802.

In some embodiments, a method includes: preemptively cooling a set of compute units of a processing unit identified for use in executing a first wavefront prior to initiating execution of the first wavefront at the set of compute units. In one aspect, the method includes: identifying an operation phase type of the first wavefront, the operation phase type indicative of an expected type of processing activity at the set of compute units; and preemptively cooling the set of compute units includes preemptively cooling the set of compute units in response to the operation phase type of the first wavefront being of a first type. In another aspect, the first type is a compute-bound type.

In one aspect, the method includes: identifying an operation phase type of a second wavefront that would execute at the set of compute units when the first wavefront is identified; and initiating cooling of the set of compute units includes initiating cooling of the set of compute units in response to the operation phase type of the second wavefront being of a second type. In another aspect, the second type is a non-compute-bound type. In still another aspect, identifying the operation phase type of the first wavefront includes identifying the operation phase type of the first wavefront based on a hint provided with the first wavefront. In yet another aspect, the method includes: generating a wavefront profile based on prior executions of the wavefront; and wherein identifying the operation phase type of the first wavefront includes identifying the operation phase type of the first wavefront based on the wavefront profile.

In one aspect, the method includes: in response to a measured temperature of a compute unit of the processing unit exceeding a thermal throttling threshold, cooling the compute unit for a specified period of time that is based on a thermal time constant associated with the processing unit. In another aspect, the specified period of time represents a single thermal time constant associated with the processing unit.

In some embodiments, a method includes: at a processing unit including a compute unit, monitoring a temperature of the compute unit; in response to a measured temperature of the compute unit exceeding a thermal throttling threshold, cooling the compute unit for a specified period of time that is based on a thermal time constant associated with the processing unit. In one aspect, the specified period of time corresponds to a single thermal time constant associated with the processing unit.

In some embodiments, a processing unit includes: a set of compute units; a scheduler to receive a first wavefront for execution at the set of compute units; and a temperature control module to, in response to the scheduler receiving the first wavefront, initiate cooling of the set of compute units prior to the scheduler initiating execution of the wavefront at the set of compute units. In one aspect the temperature control module is to identify an operation phase type of the first wavefront, the operation phase type indicative of an expected type of processing activity at the set of compute units; and the temperature control module is to initiate cooling of the set of compute units in response to the operation phase type of the first wavefront being of a first type. In another aspect, the operation phase type of the first wavefront is a compute-bound type.

In one aspect, the temperature control module is to identify an operation phase type of a second wavefront that is executing at the set of compute units when the first wavefront is identified; and the temperature control module is to initiate cooling of the set of compute units in response to the operation phase type of the second wavefront being of a second type. In another aspect, the second type is a non-compute-bound type. In yet another aspect, the temperature control module identifies the operation phase type of the first wavefront based on a hint provided with the first wavefront. In still another aspect, the temperature control module identifies the operation phase type of the first wavefront based on a wavefront profile, the wavefront profile generated based on prior executions of the first wavefront.

In one aspect, in response to a measured temperature of a compute unit of the processing unit exceeding a thermal throttling threshold, the temperature control module is to cool the compute unit for a period of time based on a thermal time constant associated with the processing unit. In another aspect, the period of time represents a single thermal time constant associated with the processing unit.

In some embodiments, certain aspects of the techniques described above may be implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   preemptively cooling a selected subset of compute units of a plurality of compute units of a processing unit prior to initiating execution of a first wavefront at the selected subset of compute units based on:
   the first wavefront comprising a first number of compute operations and a second number of memory access operations or interconnect access operations; and
   the selected subset of compute units currently executing a wavefront comprising a third number of compute operations and a fourth number of memory access operations or interconnect operations,
   wherein the first number is greater than the third number, and wherein the fourth number is greater than the second number.

2. The method of claim 1, wherein the first wavefront to be executed at the selected subset of compute units is configured to generate an increase in temperature relative to the wavefront currently executing at the selected subset of compute units.

3. The method of claim 1, wherein the wavefront currently executing at the selected subset of compute units comprises the fourth number of memory access operations.

4. The method of claim 1, further comprising:
   identifying the first number of compute operations of the first wavefront based on a hint provided with the first wavefront.

5. The method of claim 1, further comprising:
   generating a wavefront profile based on prior executions of an associated wavefront; and
   identifying the first number of compute operations of the first wavefront based on the wavefront profile.

6. The method of claim 1, wherein the cooling comprises activating a cooling element configured to cool the selected subset of compute units.

7. The method of claim 6, wherein the cooling element is a fan.

8. The method of claim 6, wherein decreasing cooling by the cooling element comprises transitioning the cooling element from a high-power state to a low-power state.

9. The method of claim 1, wherein the wavefront currently executing at the selected subset of compute units comprises the fourth number of interconnect access operations.

10. A processing unit, comprising:

a plurality of compute units comprising a selected subset of compute units;

a scheduler circuitry to receive a first wavefront for execution at the selected subset of compute units; and a processor to, in response to the scheduler circuitry receiving the first wavefront, initiate cooling of the selected subset of compute units prior to the scheduler circuitry initiating execution of the first wavefront at the selected subset of compute units based on:

the first wavefront comprising a first number of compute operations and a second number of memory access operations or interconnect access operations; and the selected subset of compute units currently executing a wavefront comprising a third number of compute operations and a fourth number of memory access operations or interconnect operations, wherein the first number is greater than the third number, and wherein the fourth number is greater than the second number.

11. The processing unit of claim 10, wherein the first wavefront to be executed at the selected subset of compute units is configured to generate an increase in temperature relative to the wavefront currently executing at the selected subset of compute units.

12. The processing unit of claim 10, wherein the wavefront currently executing at the selected subset of compute units comprises the fourth number of memory access operations.

13. The processing unit of claim 10, wherein:

the processor is configured to identify the first number of compute operations of the first wavefront based on a hint provided with the first wavefront.

14. The processing unit of claim 10, wherein:

the processor is configured to identify the first number of compute operations of the first wavefront based on a wavefront profile generated based on prior executions of wavefronts associated with the first wavefront.

15. A processor configured to:

initiate preemptive cooling of a selected subset of compute units of a plurality of compute units prior to initiating execution of a first wavefront at the selected subset of compute units based on:

the first wavefront comprising a first number of compute operations and a second number of memory access operations or interconnect access operations; and the selected subset of compute units currently executing a wavefront comprising a third number of compute operations and a fourth number of memory access operations or interconnect operations, wherein the first number is greater than the third number, and wherein the fourth number is greater than the second number.

16. The processor of claim 15, wherein the first wavefront to be executed at the selected subset of compute units is configured to generate an increase in temperature relative to the wavefront currently executing at the selected subset of compute units.

17. The processor of claim 15, wherein wavefront currently executing at the selected subset of compute units comprises the fourth number of memory access operations.

18. The processor of claim 15, wherein wavefront currently executing at the selected subset of compute units comprises the fourth number of interconnect access operations.

19. The processor of claim 15, further configured to:

identify the first number of compute operations of the first wavefront based on a hint provided with the first wavefront.

20. The processor of claim 15, further configured to:

identify the first number of compute operations of the first wavefront based on a wavefront profile generated based on prior executions of wavefronts associated with the first wavefront.

\* \* \* \* \*